March 27, 1951 H. B. FOULKS 2,546,183
TIRE DEFLATION SWITCH
Filed July 20, 1948
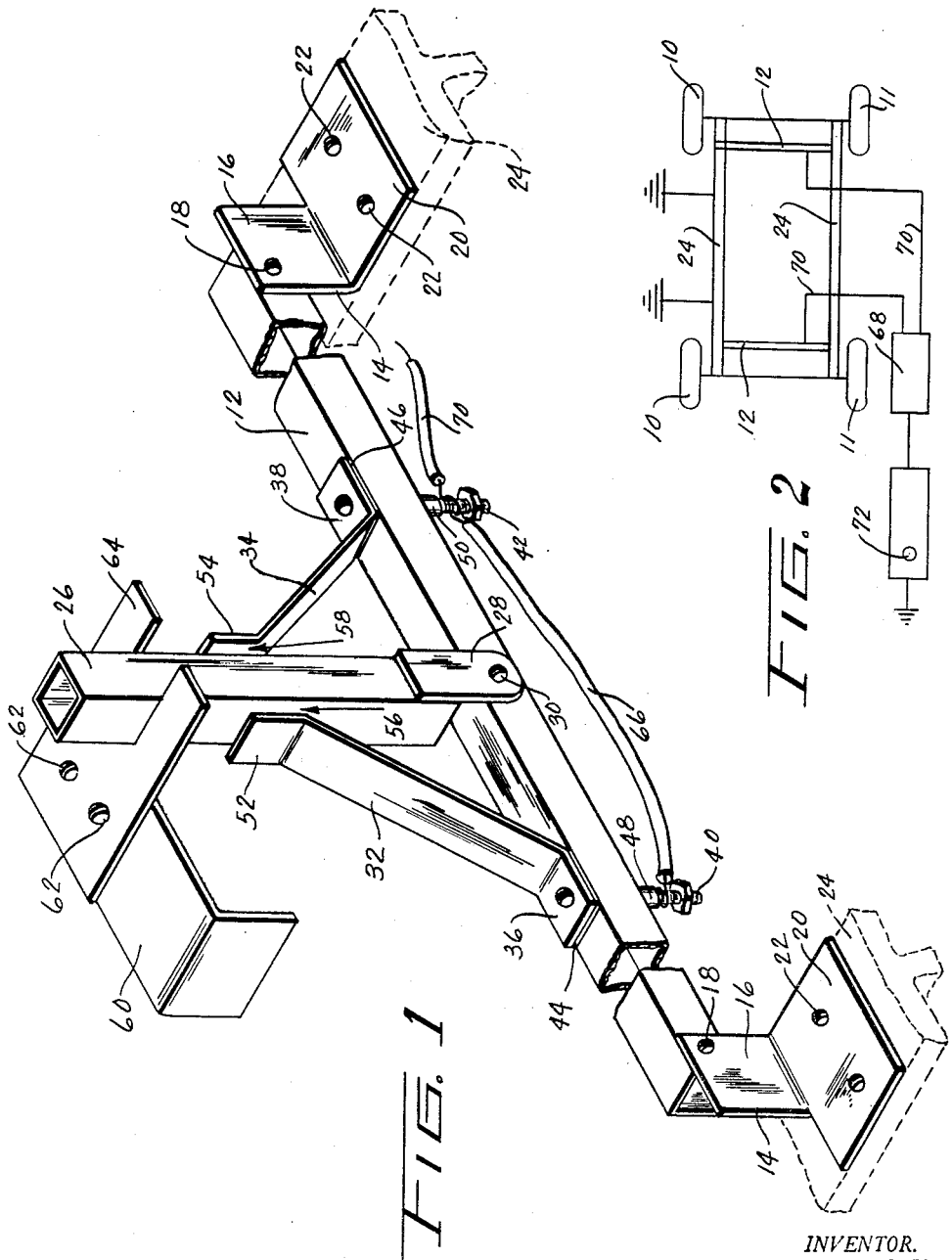
INVENTOR.
HARRY B. FOULKS
BY
Irving H. Goodfriend
ATTORNEY Patented Mar. 27, 1951

2,546,183

UNITED STATES PATENT OFFICE 2,546,183

TIRE DEFLATION SWITCH

Harry B. Foulks, New York, N. Y.

Application July 20, 1948, Serial No. 39,790

3 Claims. (Cl. 200—58)

The present invention relates to a means for indicating the deflation of a tire mounted on the wheel of a vehicle on which such indicating means is arranged.

Four wheeled vehicles, such as automobiles and for which the present invention is particularly adaptable, are equipped with pneumatic tires, which are inflated with air at a specified pressure, which for proper operation should be maintained equally on the two front and the two rear wheels.

Should one of the tires of any side by side wheels become deflated, greater wear is incurred on the deflated tire and some difficulty is experienced in steering such a vehicle.

In order to avoid a visual or mechanical inspection of tire inflation at periodic times, different devices have been proposed for automatically indicating that a tire mounted on the vehicle has become deflated.

These heretofore proposed devices have been comparatively complicated in structure, have not been adapted to be readily mounted on conventional vehicles, particularly without additions and changes to the structure of the vehicles and have been relatively expensive to produce.

The present invention therefore contemplates the provision of a means for automatically indicating that one of the tires mounted on the vehicle on which the device of the present invention is arranged has become deflated as compared with the adjacently aligned wheel that is easily and readily mounted on any conventional vehicle without requiring any change in construction of such vehicle.

The present invention further contemplates the provision of such an indicator means which is not effected by any irregularities in the surface of the road on which the vehicle is travelling or resting but which will be operated only when one tire has been deflated so that the air pressure in it is less than the air pressure in a tire on the other side of the vehicle.

The present invention still further contemplates the provision of such an indicator means which is simple in operation, relatively cheap to manufacture and which is relatively easy to install.

The present invention further contemplates the provision of an indicator means which utilizes the members of an existing vehicle structure without requiring any change thereto or reconstruction thereof.

These, other and further objects and advantages of the present invention will be clear from the description which follows and the drawings appended thereto, in which Fig. 1 is a perspective view of an indicator means according to my invention, the members being broken to condense the drawing.

Fig. 2 is a schematic view showing the relation of elements forming my indicating means and members of a vehicle on which they are mounted and the wiring diagram for their operation.

Referring now to the drawing, the indicator means of my invention and one of which I preferably use for each pair of adjacent wheels 10 and 11 includes the cross member 12. This cross member is preferably made of a square in cross section, hollow rod of an electric conducting material, for example, brass.

At each end of the cross member 12, I mount the brackets 14, as by securing one face 16 thereto by the head screw 18. This construction permits the cross members to be adjusted to various widths of vehicle frames since the face 16 may be secured at different points to the cross member. The other face 20 of the bracket is secured as by the screws 22 to the side elements 24 of the vehicle frame.

At the center of the cross-member 12 and thus equidistant from the sides of the chassis and each adjacent wheel 10, I pivotally mount the upright 26 as by the plate element 28 and the pivot screw 30. The cross member 12 thus may move about the pivot 30 in a clockwise or counterclockwise direction as viewed in Fig. 1, the upright 26 being held in a substantially vertical position, as I shall describe.

The upright 26, the plate element 28 and the pivot screw 30 are also made of an electric conducting material.

On each side of the upright 26 and spaced equidistantly therefrom, I provide the inclined contacting members 32 and 34. Each contacting member is bent at the lower end thereof to form the horizontal lips 36 and 38 which are each secured to the cross member 12 by means of the lead screws 40 and 42.

The horizontal lips 36 and 38 are insulated from the cross member 12 as by the insulating plates 44 and 46, the lead screws 40 and 42 being also insulated therefrom as by the collars 48 and 50.

The other or upper ends of each contacting member 32 and 34 are bent to form the vertical lips 52 and 54 which are equidistantly spaced from the upright 26 to form the normally open equal gaps 56 and 58.

Secured at the center of the vehicle chassis to any available underside part as by the bracket 60 and screws 62, I provide the slotted guide member 64, in the slot of which the upright 26 is free to vertically reciprocate but which guide member restrains any sidewise movement of the upright.

The contacting members 32 and 34 are wired in parallel by means of the cable 66 which is secured at its ends to the lead screws 40 and 42. The contacting members, which as will be seen, form with the upright a normally open switch are wired to one side of the battery 68 by means of the cable 70.

The other side of the battery 68 is wired, in any conventional manner, to one side of the indicator 72, preferably a red light mounted on the dash board of the vehicle and the other side of which is grounded to the frame of the vehicle. It will be recognized that the cross member 12, since it is secured at each side to the frame of the vehicle, is likewise grounded.

An electric circuit, which is normally opened by the formation of the gaps 56 and 58, is closed by the engagement of the lip 52 or 54 with the upright 26, as I shall explain, and is then completed through the member 32 or the member 34, the battery 68, the indicator 72, through the ground and the cross member 12.

Since the sides of the frame are parallel when the tires 10 and 11 are equally inflated, the gaps 56 and 58 are, in this condition of the vehicle, formed between the upright 26 and the contacting members 32 and 34 and thus the circuit through the indicator 72 is not completed. Should one tire become deflated, for example, the tire 10, the left hand side of the vehicle will be lowered to tilt the entire frame.

To illustrate the operation of my device, under such circumstances, the right side as viewed in Fig. 1 will in effect move up. Since the upright 26 is held stationary by the guide member 64, the cross member 12 will therefore move about the pivot 30, thereby closing the gap 58 to bring the lip 54 into engagement or contact with the upright and thus complete the circuit through the indicator 72.

Operation of the indicator 72, whether a light or a buzzer or other means apprises the driver of the vehicle that a tire has become deflated and it becomes only necessary for further investigation. My device can be made extremely sensitive by making the gaps 56 and 58 and the clearance between the upright 26 and the guide member 64 as small as desired.

Movement of a vehicle over the rough surface of a road will not close either gap because the wheel striking the uneven surface will reciprocate vertically and the cross member 12 maintained between the frame members in a horizontal position due to the movement resulting from the suspension springs of a conventional vehicle.

Further, should the vehicle be parked so that one side is lower or higher than the other side since the ends of the cross members 16 are mounted on the sides of the vehicle frame and the bracket on which the guide member 64 is secured is mounted on the center of the frame, the entire indicator mechanism will assume the angle of the car and frame to thereby maintain the gaps between the vertical member and the contacting members in normal open position.

It will be apparent that should the tire on the right side of the automobile on which my indicating means is mounted, which, as viewed in Fig. 1, is to the right of that figure, become deflated, the member 16 on that side will be lowered.

The cross member 12, since it is secured to the upright 26 by means of the pivot 30, will rotate thereabout in a clockwise direction, as viewed in Fig. 1.

As this movement occurs, the upright 26 is held by the fingers of the guide member 64 and therefore must move downward in a vertical line. The clockwise motion of the crosspiece 12 and restrained downward straight line motion of the upright 26, thereby brings the lip 52 toward and into contact with the crosspiece 26 when the gap 56 is closed.

The converse occurs when the tire on the left side of the automobile is deflated and the cross member 12 oscillates about the pivot 30 in a counterclockwise direction as viewed in Fig. 1.

By reason of the fact that the upright 26 is restrained by the guide member 64, the lip 54 will move toward and into contact with the upright 26.

When either lip 52 or 54 is brought into contact with the upright 26, a circuit is completed through the indicator 72, thereby indicating to the occupant of the automobile that one of the tires has been deflated.

These normally open gaps will be closed only when one side of the vehicle frame is lower than the other side because the tire on that side has become deflated whereupon the cross member 12 is tilted about its pivot 30 to bring the corresponding lip 52 or 54 against the upright 26.

It will be recognized that the cross member 12, upright 26, plate-like member 28 and engaging members 32 and 34 may be made of a non-electrical conducting material, in which event they can be properly wired to complete a circuit through the battery 68 and indicator 72 upon contact with the upright 26 by either one of the engaging members 32 or 34.

While I have shown and described an illustrative embodiment of my invention, I do not intend to be limited to the details thereof but intend to claim my invention as broadly as the scope of the appended claims and the prior art permit since changes in the details illustrated may be made by those skilled in the art without department from the spirit and scope of the invention as claimed.

I claim:

1. In a device of the character described for mounting on the frame of a vehicle, a cross member, means for securing each end of the cross member to a side of the frame of the vehicle, an upright, a pivot for pivotally mounting said upright on the cross member and equally spaced from each side of the frame, a member on each side of the upright and equally spaced therefrom to form a gap therebetween normally open, each member forming an electrical circuit with the upright and the cross member and a source of electrical current upon closing the gap between the upright and an engaging member and a guide member restraining movement of the upright toward a member, said cross member oscillatable on the pivot to bring a selected member into contact with the upright to close the gap therebetween and complete the said electrical circuit.

2. The device as set forth in claim 1, wherein said securing means is arranged to adapt said cross member to a specified width of vehicle frame.

3. In a means for indicating the deflation of a tire of a vehicle on which the means is mounted, a cross member, means for securing each end of the cross member to the sides of the frame of the vehicle on which the means is mounted, the center of the cross member being equi-distantly spaced from each side of the vehicle, an upright pivotally secured to the cross member at the center thereof, an engaging member mounted on the cross member on each side of the upright and equi-distantly spaced therefrom to form equal normally open gaps therebetween, said engaging members electrically insulated from the cross member, said engaging members electrically connected in parallel to one side of a source of electrical current, and a guide member mounted on the vehicle equi-distantly from the sides of the frame of the vehicle and between which guide member the upright may be reciprocated, said guide member restraining movement of the upright toward an engaging member whereby said cross member may oscillate on the upright to bring an engaging member into engagement with the upright and close a circuit through the source of electrical current, said upright, cross member and engaging member having an electrical current carrying characteristic.

HARRY B. FOULKS.

REFERENCES CITED

The following references are of record in the file of this patent:

UNITED STATES PATENTS

| Number | Name | Date |
| --- | --- | --- |
| 1,565,687 | Tomlinson | Dec. 15, 1925 |